UNITED STATES PATENT OFFICE.

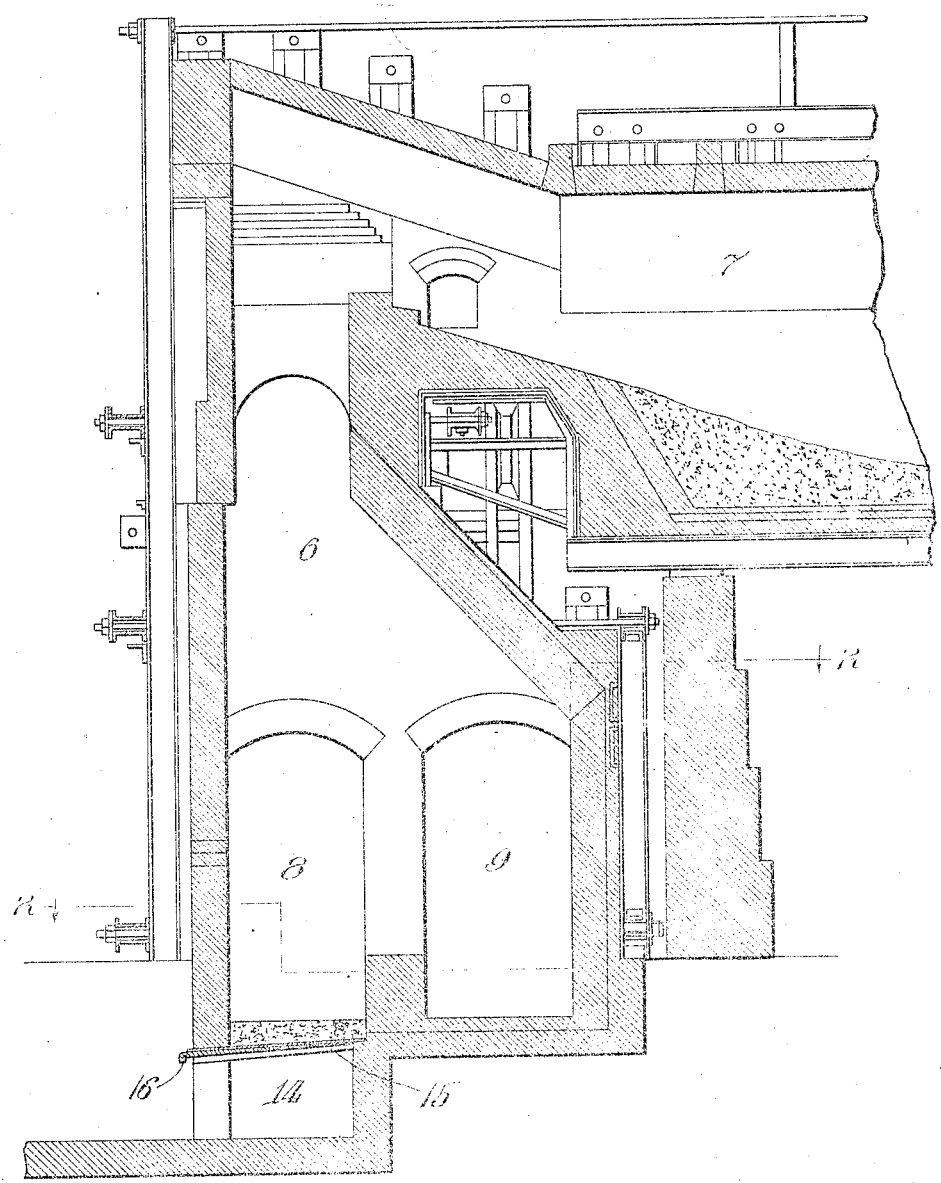

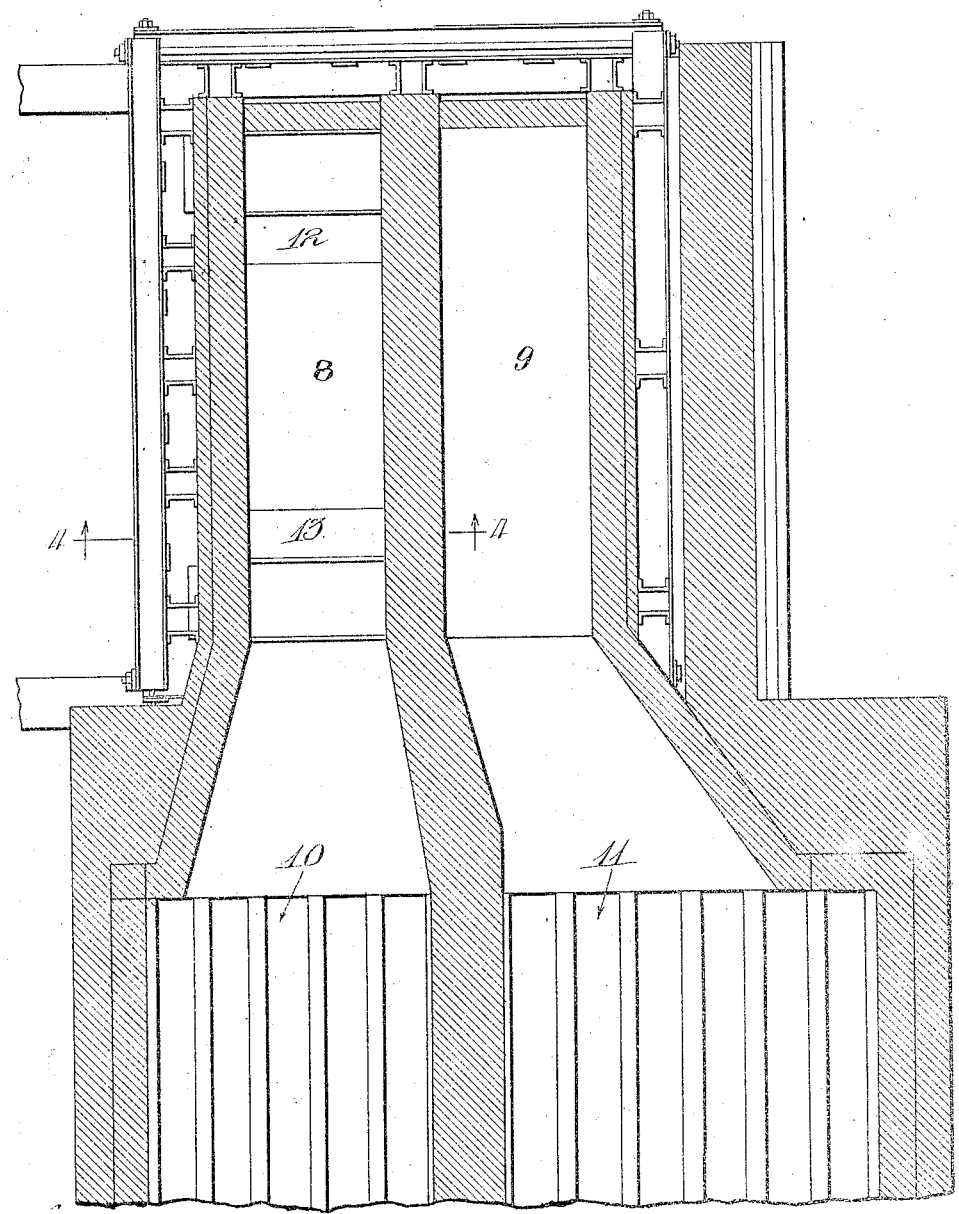

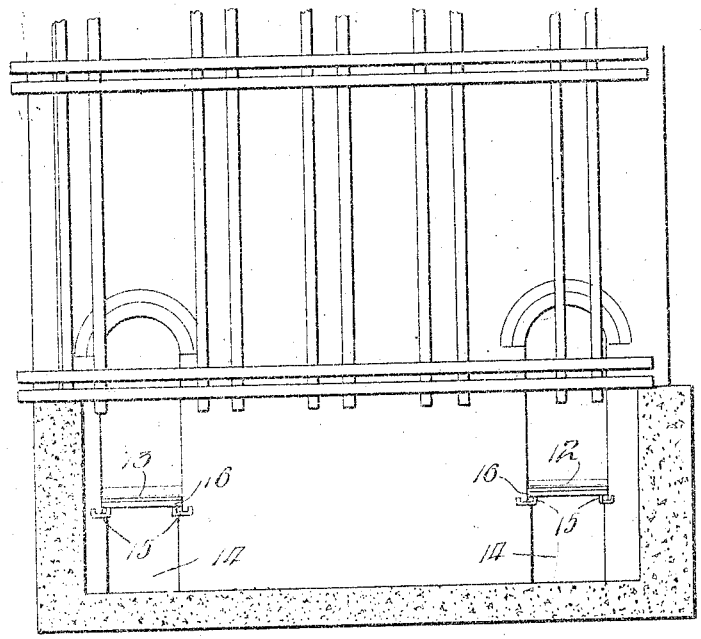
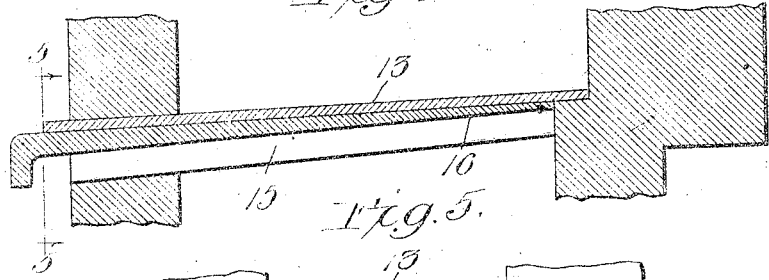
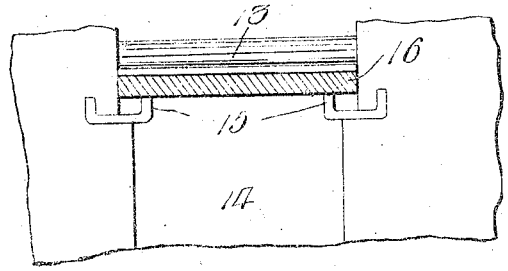

JOHN W. GALVIN, OF INDIANA HARBOR, INDIANA.

HEATING-FURNACE.

1,057,338. Specification of Letters Patent. Patented Mar. 25, 1913.

Application filed May 21, 1912. Serial No. 700,701.

*To all whom it may concern:*

Be it known that I, JOHN W. GALVIN, a citizen of the United States, residing at Indiana Harbor, in the county of Lake and State of Indiana, have invented certain new and useful Improvements in Heating-Furnaces, of which the following is a specification.

In heating furnaces as now constructed, considerable quantities of slag accumulate traveling through the downcomers into the flues or passages intermediate the checkerwork, resulting in the clogging or obstructing of said passages, consequently eliminating the necessary draft from the furnace through the downcomers to the checkerwork. In furnace operation, there is considerable accumulation of this slag, which tends to obstruct the flow of the heated gases, impeding and obstructing the work of the furnace and resulting in the necessity of shutting down and clearing out the accumulated slag therein, thereby causing much loss of time and labor.

The essential object of this invention is to provide a furnace construction wherein an improved slag pocket is utilized, so that the accumulations of slag may be removed therefrom without interfering with the operation of the furnace and with comparatively little time and labor, and the furnace gases will always be free to flow from the furnace through the downcomer to the checker-work.

The invention further consists in the features of construction and combination of parts hereinafter described and claimed.

In the drawings, Figure 1 is a vertical sectional furnace end elevation; Fig. 2 is a cross section taken on line 2—2 of Fig. 1; Fig. 3 is a furnace end elevation; Fig. 4 is a sectional detail, taken on line 4—4 of Fig. 2, showing a preferred form of removable damper; and Fig. 5 is a cross section taken on line 5—5 of Fig. 4.

Referring to Fig. 1, a downcomer 6 is shown, communicating with and leading from a furnace heating chamber 7, merging at its lower end into companion flues or ducts 8 and 9 respectively, the slag from said heating furnace accumulating in the base of the flue or duct 8 which is immediately below the downcomer 6, and said flues or ducts, as shown in Fig. 2, open into separate adjacent checker-work chambers 10 and 11 of any approved form of construction. Two separate removable slag dampers 12 and 13 are shown, for effecting a complete discharge of the accumulated slag within the duct or chamber 8 to the slag pit 14 therebeneath. As best shown in Figs. 3, 4 and 5, these movable dampers 12 and 13 are positioned upon suitable cross supporting rails 15 of any approved construction. It is preferred, however, to use channel rails anchored in the brick-work or masonry, or T-shaped rails may be employed, provided a strong sustaining surface is available. Said supporting rails 15 are shown inclined transversely of and adjacent to the base of the slag chamber, for maintaining the removable dampers in set position.

In practical use and operation, it has been found that the slag as it accumulates tends to solidify and take the form of a compact homogeneous mass which it is exceedingly difficult to disintegrate and remove therefrom, and for this purpose I prefer to use a damper wedge 16 of any suitable shape or construction which may tend to maintain the damper in set position, and when withdrawn from the damper and supporting rails will afford a clearance for the damper sufficient to enable it to fall clear of the accumulated mass of slag within the chamber, for permitting its ready removal and withdrawal therefrom. Obviously, any form of wedge member may be employed for this purpose, although its use is not absolutely essential.

It has been found that if the removable dampers 12 and 13 are withdrawn from the slag chamber approximately once a week, it is sufficient for enabling the accumulated slag to be removed therefrom with a minimum of time and labor, and without unduly interfering with the operation of the furnace, whereby the flow of gases from the furnace chamber into the downcomer and through the checker-work is never substantially impeded or obstructed. These removable dampers may be made of steel, cast iron, or any other material adapted for the uses and purposes contemplated herein, and the auxiliary wedge members may be of any practical formation for sustaining and locking the dampers, which are preferably inclined in set position transversely of the slag chamber.

Preferably three or four inches of sand is spread upon the damper, forming an air tight seal and preventing warping of the damper.

Obviously, this invention may be used to advantage in all types of open hearth furnaces and heating furnaces having slag pockets therein.

I claim:

1. In a furnace, the combination of a downcomer and flues leading therefrom, removable dampers for enabling the accumulation of slag to be withdrawn from the furnace structure, means for supporting said dampers in fixed set position transversely of the flue beneath and adjacent to the downcomer, and one or more wedging members positioned upon said supporting means beneath said dampers, for locking said dampers in set position, which wedging members when withdrawn afford a clearance for enabling the dampers to be removed without undue contact with the accumulated mass of slag therein, whereby a continuous passage is always afforded for the travel of the combustion gases from the furnace chamber through the downcomer to the checker-work, substantially as described.

2. In a furnace, the combination of a downcomer and flues leading therefrom, removable dampers positioned transversely through the flue beneath and adjacent to the downcomer, a plurality of transverse supporting channel bars partially embedded in the furnace structure, the projecting sides thereof forming supporting surfaces for said dampers, which when withdrawn enable the accumulated slag to be removed from the furnace structure, thereby always affording a continuous passage for the travel and flow of the combustion gases from the furnace chamber through the downcomer to the checker-work, substantially as described.

3. In a furnace, the combination of a downcomer and flues leading therefrom, removable dampers positioned transversely through the flue beneath and adjacent to the downcomer, wedging members for locking the removable dampers in fixed set position, and when removed enabling the dampers to be withdrawn, and a plurality of transverse supporting channel bars partially embedded in the furnace structure, the projecting sides thereof forming supporting surfaces for said dampers, which when withdrawn enable the accumulated slag to be taken from the furnace structure, thereby always affording a continuous passage for the travel and flow of the combustion gases from the furnace chamber through the downcomer to the checker-work, substantially as described.

4. In a furnace, the combination of a downcomer, a pit beneath the lower end of the same, and a removable plate interposed between the pit and the lower end of the downcomer for the purpose of catching and sustaining the accumulated slag, substantially as described.

5. In a furnace, the combination of a downcomer, partitions for providing a slag pocket at the lower end of the same, a pit beneath said slag pocket, and a removable plate interposed between the slag pocket and the pit, substantially as described.

6. In a furnace, the combination of a downcomer, a pit beneath the lower end of the same, a removable plate interposed between the lower end of the downcomer and the pit, and a layer of sand on the upper surface of said plate for the purpose of receiving the accumulated slag and sustaining the same out of contact from the plate, substantially as described.

7. In a furnace, the combination of a downcomer, a pit beneath the lower end of the same, and a slidable plate introduced between the pit and the lower end of the down-comer for the purpose of catching and sustaining accumulated slag, whereby as the plate is slid horizontally to place the downcomer in communication with the pit and accumulated slag sustained by the upper face of the plate is stripped therefrom and allowed to fall into the pit, substantially as described.

8. In a furnace, the combination of a down-comer, a pit beneath the lower end of the same, side rails at the sides of the pit, and a removable plate slidably mounted on said rails, and adapted to be forced inward to separate the down-comer from the pit, whereby slag in the down-comer will be deposited on the upper face of the plate, substantially as described.

JOHN W. GALVIN.

Witnesses:
 WALKER BANNING,
 ROBT. SMITH.